Sept. 15, 1931.  C. J. BOCK  1,823,422

REAR AXLE WHEEL BEARING LUBRICATION

Filed Oct. 19, 1927

Inventor
Carl J. Bock
By Blackmore, Spencer & Finch
Attorneys

Patented Sept. 15, 1931

1,823,422

UNITED STATES PATENT OFFICE

CARL J. BOCK, OF PONTIAC, MICHIGAN, ASSIGNOR TO YELLOW TRUCK AND COACH MANUFACTURING COMPANY, OF PONTIAC, MICHIGAN, A COMPANY OF MAINE

REAR AXLE WHEEL BEARING LUBRICATION

Application filed October 19, 1927. Serial No. 227,168.

This invention relates to motor vehicles and particularly to the lubrication of the rear axle bearings at the outer ends of the axle housing.

The invention aims to overcome certain difficulty that has been experienced with rear wheels throwing grease and oil. Practically all types of wheel bearings now in general use are at times subjected to over-lubrication by the car owner, and the excess lubricant is forced past the bearing closures or packings, into the brake assembly and then due to centrifugal action, it works out the side of the brake drum and is splashed on the wheels and tires. To eliminate this trouble and obviate the detrimental effects of grease on the brake bands and tires, it is proposed to provide the bearing housing with a vent to relieve the pressure and lead surplus grease and oil out of the housing, where it may drop to the ground.

Figure 1:
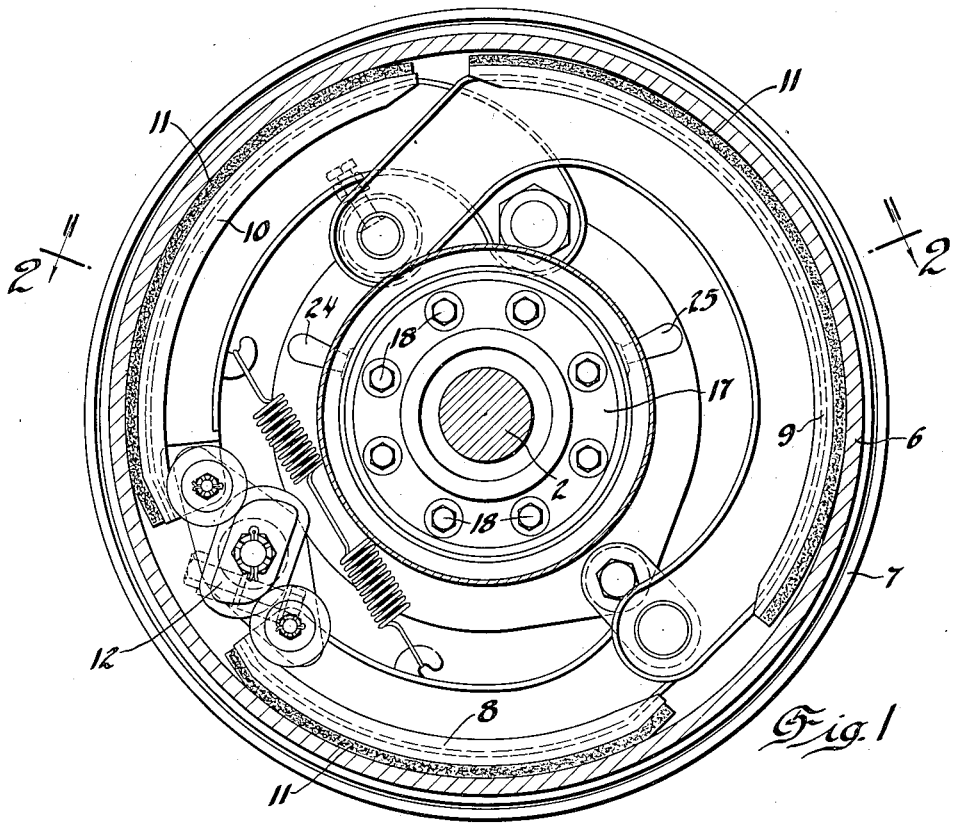
Figure 2:
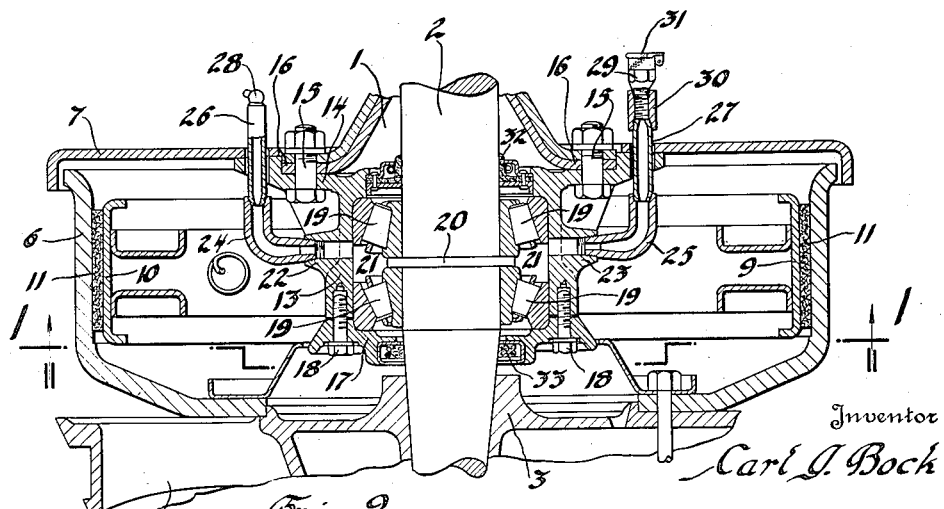

In the accompanying drawings wherein a preferred embodiment of the invention is illustrated in detail, Fig. 1 is a side elevation, partly in section, of the rear axle brake assembly and bearing housing, taken on line 1—1 of Fig. 2, and Fig. 2 is a transverse sectional view on line 2—2 of Fig. 1.

Referring to the drawings, the numeral 1 indicates the rear axle housing for the live axle or rotating shaft 2. Splined or keyed on the end of the shaft, is the hub 3 of the wheel 4, carrying a brake drum 6 on the inner side thereof, the open end of the drum being closed by a protective shield or plate 7. A brake assembly of a well known internal expanding type is shown as being active on the inner surface of the drum, and comprises a series of shoes 8, 9 and 10, faced with friction lining 11, and actuated by a cam 12. Since the particular brake construction does not form an essential part of the present invention it will not be further described.

Adjacent the wheel and within the brake drum is a circular housing 13, having a peripheral flange 14 secured by bolts 15 to the annular flange 16, formed at the end of the axle housing 1, whereby the housing 13 is supported by the axle housing. A removable plate 17, held over one end of the housing by fastening bolts 18, permits access to the interior of the housing. Carried within the housing are two sets of anti-friction elements or roller bearings 19—19, spaced apart and located on either side of peripheral rib 20 integral with the axle 2, leaving an intermediate space or cavity 21. Inlet and outlet ducts lead to and from this intermediate space, there being provided for this purpose a pair of hollow bosses 22 and 23 on opposite sides of the upper part of the housing, having elbow fittings 24 and 25 respectively, screw threaded therein, which carry short lengths of tubing 26 and 27 extending laterally through the flange 14 and plate 7, to the outside of the inclosed assembly. A nipple or fitting 28 is provided in the end of the tubing 26 for engagement with the detachable coupling of a conventional pressure lubricating system. Other means, however, may be employed to introduce lubricant under pressure through the inlet. A fitting 29 is held by a coupling sleeve 30 on the end of the tube 27, and has a pivoted closure cap 31, yieldingly held over the discharge end of the outlet by suitable spring means, to prevent the entrance of dust and dirt. In order to seal or close the housing against leakage of lubricant axially of the shaft, suitable packing elements 32 and 33 are provided at opposite ends of the housing, to surround and tightly hug the shaft.

With constructions heretofore employed, the pressure under which lubricant was forced into the bearing housing, placed the packing elements under abnormal strain, eventually causing their break-down and resulting in leakage. The present arrangement eliminates this trouble by introducing the lubricant, which may be either grease or oil, into the central space whence it can work outwardly through the bearings, and from which space leads the outlet duct providing a relief for the pressure and excess lubricant. The packings at the outer ends of the housing are thus saved from harm.

The inlet and outlet ducts may be placed at any predetermined height on the housing in accord with the desired amount or level of the lubricant to be introduced. When filling the cavity, the operator forces lubricant through the inlet until he notes the surplus working its way out and overflowing through the discharge opening of the outlet, at which time he is assured or having injected a sufficient supply, without disturbance of the packing seals.

While the above description has been more or less specific as to details, it is to be understood that such modifications may be made as come within the scope of the appended claims.

I claim:

1. Lubricating means for live axle bearings, including in combination a rotating shaft, axially spaced bearing surfaces for the shaft, an axle housing inclosing and supporting said bearing surfaces and providing an annular lubricant cavity surrounding the shaft and intermediate said axially spaced bearing surfaces, an inlet for lubricant under pressure leading into said cavity and an unobstructed outlet passageway leading directly from the cavity to relieve pressure therein and provide an overflow for excess lubricant.

2. Lubricating means for live axle bearings, including in combination a rotating shaft, a bearing housing through which the shaft extends anti-friction bearing elements for said shaft carried within said housing in spaced apart groups, an inlet duct for lubricant under pressure leading into the housing space intermediate said grouped bearing elements, packing means surrounding the shaft at opposite ends of the housing forming seals against lubricant leakage, and an outlet duct leading directly from said intermediate space adapted to relieve excess lubricant and pressure from within the housing and on said packings.

3. The combination with a live axle, a rotating wheel keyed on said axle and a brake drum carried by said wheel, of a bearing housing located within said brake drum, anti-friction bearings for said axle, contained in said housing and spaced apart to provide a lubricant cavity, an inlet for lubricant under pressure leading to said cavity, packing means adapted to prevent lubricant leaking from the housing onto the brake drum, and means to relieve pressure on said packing and in said cavity, and comprising an unobstructed passageway leading directly from the cavity.

4. The combination with a live axle, a rotating wheel keyed on said axle and a brake drum carried by said wheel, of a bearing housing located within said brake drum, anti-friction bearings for said axle, contained in said housing, in spaced apart groups, an inlet for lubricant under pressure leading into the space intermediate said grouped bearings, packing rings associated with the axle at both ends of the housing to seal the housing against leakage of lubricant onto the brake drum, and means to relieve pressure in said housing and on the packings, including an outlet leading directly from said intermediate space.

5. In combination, a rotating shaft, a bearing therefor, a stationary housing supporting the bearing and affording a lubricant cavity, seals surrounding the shaft at opposite ends of the housing to retain the lubricant in the cavity, means to introduce lubricant under pressure into said cavity, and means to automatically relieve pressure within the cavity so as to prevent injury to the seals.

In testimony whereof I affix my signature.

C. J. BOCK.